United States Patent
Martin

(10) Patent No.: US 7,113,887 B2
(45) Date of Patent: Sep. 26, 2006

(54) METHOD AND APPARATUS FOR SIZING A POWER PROCESSING DEVICE SERVING MULTIPLE DRIVE UNITS

(75) Inventor: Timothy J. Martin, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 18 days.

(21) Appl. No.: 10/955,815

(22) Filed: Sep. 30, 2004

(65) Prior Publication Data

US 2006/0074573 A1 Apr. 6, 2006

(51) Int. Cl.
*G06F 15/00* (2006.01)

(52) U.S. Cl. .................. 702/182; 318/433

(58) Field of Classification Search .......... 702/34, 702/54, 56, 181–183; 318/59, 68, 77, 85, 318/163, 433–434, 806
See application file for complete search history.

(56) References Cited

U.S. PATENT DOCUMENTS

| | | | | |
|---|---|---|---|---|
| 4,092,571 A * | 5/1978 | Hopkins et al. | ............ | 318/106 |
| 4,809,803 A * | 3/1989 | Ahern et al. | ............... | 180/65.4 |
| 5,086,964 A * | 2/1992 | Blaser | ........................ | 226/108 |
| 5,362,222 A * | 11/1994 | Faig et al. | ................... | 425/145 |
| 5,710,723 A * | 1/1998 | Hoth et al. | .................. | 702/181 |
| 6,199,018 B1 * | 3/2001 | Quist et al. | ................... | 702/34 |
| 6,771,032 B1 * | 8/2004 | Cox-Smith et al. | ........... | 318/85 |

* cited by examiner

*Primary Examiner*—Hal Vacheman
*Assistant Examiner*—Mary Catherine Baran
(74) *Attorney, Agent, or Firm*—Quarles & Brady, LLP; Alexander M. Gerasimow

(57) ABSTRACT

A method for determining supply requirements for a motor control system includes determining a performance profile for each of a plurality of drive units. A power supply parameter for each drive unit is generated based on the performance profiles. The power supply parameters for the drive units are combined to generate a rating parameter for the motor control system. In some embodiments, instructions for implementing the method may be encoded on a program storage device or programmed into a processing device for execution.

20 Claims, 3 Drawing Sheets

METHOD AND APPARATUS FOR SIZING A POWER PROCESSING DEVICE SERVING MULTIPLE DRIVE UNITS

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to motion control systems, and, more particularly, to a method and apparatus for sizing a power processing device serving multiple drive units.

Motion control systems such as those employed in industrial environments typically require power from one or more power sources, in the form of primary and/or auxiliary power. Not uncommonly, different types or levels of power (e.g., DC or AC power), or powers having multiple different characteristics (e.g., different voltage levels, current levels, etc.) are required.

Typically, the power that is provided to the motion control systems is received from one or more power lines (e.g., a utility grid) and then converted into the desired forms of power. However, in certain embodiments, power can be received from power sources other than power lines, such as local power generation sources (e.g., local generators or batteries).

To provide the required forms of primary, control, and/or auxiliary power to the motion control systems based upon the received power, many different front-end circuit components are often required. These front-end circuit components not only can provide power conversion, but also can serve other purposes as well, for example, circuit protection to protect against power spikes. For example, the National Electric Code requires that branch circuit protection be provided in connection with the delivery of power to motor controllers/motor drivers.

Among the many different circuit components that can be utilized in any given system are power conversion components, switching components, such as contactors, protective components, such as circuit breakers and fuses, filtering components, and even additional power sources. Power processing circuitry may be implemented on an "ad hoc" basis when motion control systems are installed or specialized power processing devices may be implemented.

One factor that influences the complexity and cost of a power processing circuit or device is the current required to supply the served drive units. Some drive units may serve only a single axis machine, while other drive units may serve multiples axes. Typically, the power processing device is sized based on the maximum current ratings for the served drive units. The number of drive units that a particular power processing device can serve is thus limited by the sum of the maximum current ratings.

In actual operation, the current requirements for a given drive unit are typically much less than the rated current. Using rated current to size the power processing device reduces the number of drive units that be served by each power processing device, thereby increasing the number or rating of the installed power processing device, which increases the cost and complexity of the motor control system. Therefore, there is a need for a technique to size power processing devices serving one or more drive units that incorporates the actual demand requirements of the drive units.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The present inventors have recognized that a technique for sizing a power processing device serving one or more drive units can incorporate the actual demand requirements of the drive units. Accurate sizing of the power processing device reduces system cost by allowing a lower rated, less expensive, power processing device to be used, or by allowing a higher number of drive units to be served by a given power processing device.

One aspect of the present invention is seen in a method for determining supply requirements for a motor control system. The method includes determining a performance profile for each of a plurality of drive units. A power supply parameter for each drive unit is generated based on the performance profiles. The power supply parameters for the drive units are combined to generate a rating parameter for the motor control system.

Another aspect of the present invention is seen in a program storage device encoded with instructions that, when executed by a processing device, implement the method.

Yet another aspect of the present invention is seen in a processing device programmed with instructions that, when executed, perform the method.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
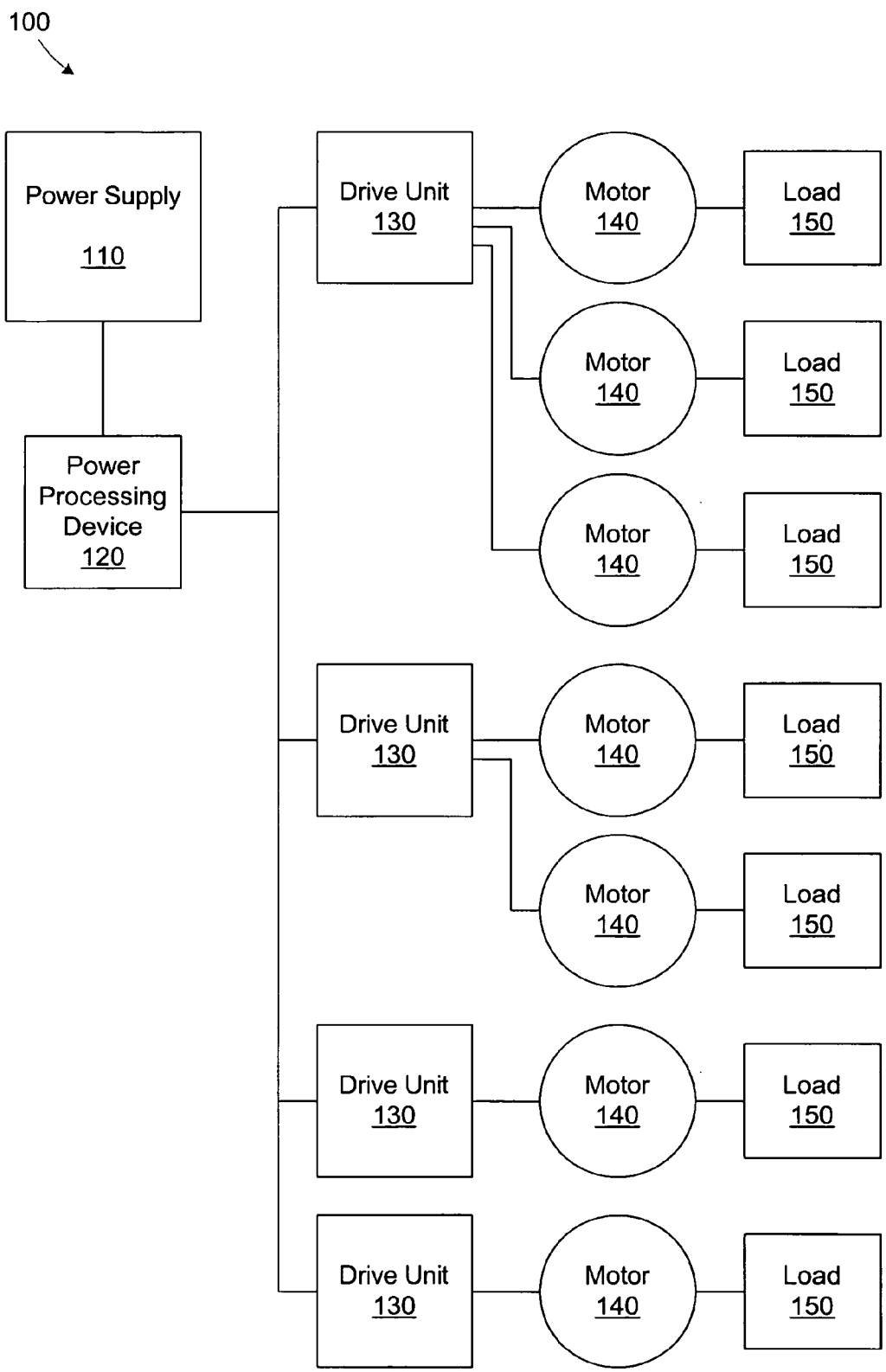
FIG. 1 is a simplified block diagram of a motor control system in accordance with one embodiment of the present invention.

Referring now to the drawings wherein like reference numbers correspond to similar components throughout the several views and, specifically, referring to FIG. 1, the present invention shall be described in the context of a motor control system 100. The motor control system 100 includes a power supply 110, a power processing device 120, and one or more drive units 130. The power supply 110 typically provides an AC voltage received from a utility grid. The power processing device 120 performs various functions, such as power conversion, switching, protection, filtering, etc. The power processing device 120 may serve one or more drive units 130. A commercially available power processing device 120 capable of performing the described power conditioning and protection functions is a line interface module (LIM) offered by Rockwell Automation, Inc. of Milwaukee, Wisc. Exemplary line interface modules include models 2094-AL09, 2094-AL75S, 2094-BL02, 2094-BL75S, and 2094-XL75S-Cx. Different models have different voltage and/or current ratings. An exemplary line interface module is also described in U.S. patent application Ser. No. 10/955,106, entitled "Line Interface Module," in the names of Edward J. Arguello, Jr., Michael J. Nelson, Nathaniel D. Herman, and Randall R. Holterman, filed on Sep. 30, 2004, and incorporated herein by reference in its entirety.

The drive units 130 generate voltage for powering motors 140 and their associated loads 150 (i.e., referred to as an axis). A particular drive unit 130 may serve multiple axes or a single axis. The construction and operation of drive units 130 for performing this function are well known to those of ordinary skill in the art. Exemplary drive units 130 are drives in the Kinetix 6000 drive family offered commercially by Rockwell Automation, Inc. In general, the drive units 130 produce positive and negative voltage pulses in specific sequences to generate AC voltages having controllable amplitudes and frequencies for the associated motors 140.

Figure 2:
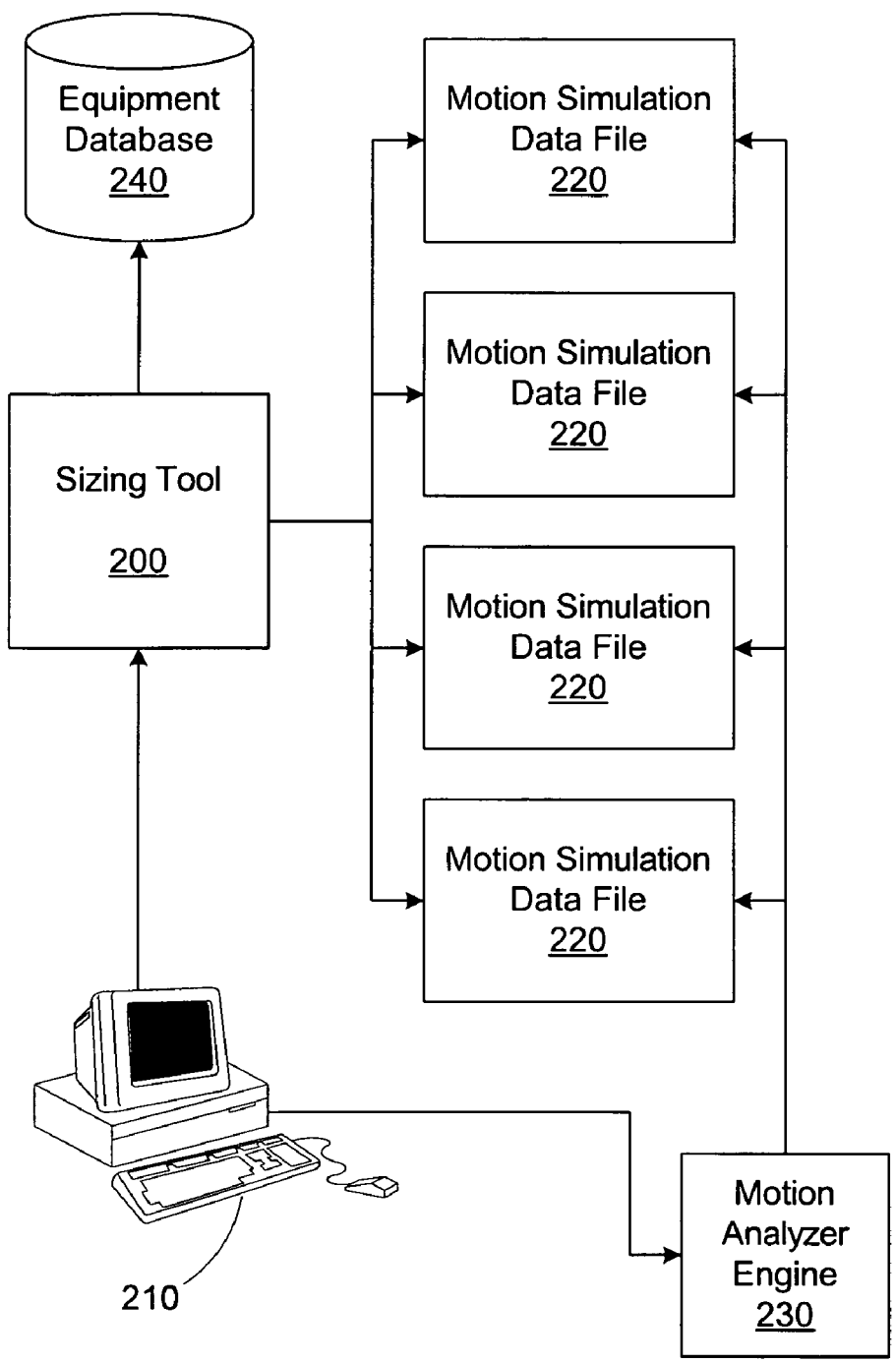
FIG. 2 is a simplified block diagram of a sizing tool for determining current rating requirements for a power processing device in the motor control system of FIG. 1.

Turning now to FIG. 2, a simplified block diagram of a sizing tool 200 for determining current rating requirements for the power processing device 120 in the motor control system 100 of FIG. 1 is provided. The sizing tool 200 is implemented by software executing on a general-purpose or specialized processing device 210. The sizing tool 200 evaluates motion simulation data files 220 for each of the drive units 130 served by the power processing device 120.

A motion analyzer engine 230, executing on the processing device 210 or a different processing device, may be used to generate the motion simulation data files 220. Motion analyzers and sizing tools are known to those of ordinary skill in the art. An exemplary motion analysis tool suitable for generating the motion simulation data files 220 is Motion Analyzer, Version 4.1, offered by Rockwell Automation, Inc. The motion analyzer engine 230 uses information regarding a single drive unit 130 and its associated motor/load axes to determine operating characteristics (e.g., torque, power requirements, suitability, etc.) for the drive unit 130. One parameter determined by the motion analyzer engine 230 is the peak and continuous power requirements of the drive unit 130. The motion analyzer engine 230 evaluates the specified operating requirements for each axis (e.g., duty cycle, acceleration, torque, etc.) and information regarding the specific amplifiers, motors, and loads that make up each axis to determine the suitability of the selected hardware and/or to recommend hardware that meets the requirements.

In general, the sizing tool 200 uses data in the motion simulation data files 220 for each drive unit 130 served by the power processing device 120 to determine current profiles for each of the drive units 130. The sizing tool 200 combines the current profiles to generate current rating requirements for the drive unit 130.

One component of a motion simulation data file 220 is a power profile for the drive unit 130. Each axis typically has associated peak and continuous power requirements. In some cases, one or more of the axes may be synchronized. For example, if one axis typically starts a known period of time after another axis, the peak power for the axes will not occur at the same time. The motion analyzer engine 230 accounts for this synchronization and the total peak power is less than the sum of the two peak power values. In the case, where the axes are not synchronized (i.e., random with respect to each other), the motion analyzer engine 230 may use a worst-case approach where all non-synchronized axes achieve peak power requirements at the same time.

The sizing tool 200 extracts the peak and continuous power requirements for each drive unit 130 from the motion simulation data files 220 and converts the power profiles to current profiles. The sizing tool 200 may convert the power values to current values using the nominal line voltage provided to the drive units 130. Alternatively, the sizing tool 200 may consider a range of line voltages (e.g., a nominal voltage with +/− tolerances, or a user-specified voltage range).

After computing the current requirements for the drive units 130, the sizing tool 200 may sum the individual current requirements to generate a total continuous and/or peak current requirement that the power processing device 120 must support. In combining the individual current components for the drive units 130, the sizing tool 200 may consider synchronization information regarding the drive units 130. A user may specify synchronization parameters for the various drive units 130. The synchronization between drive units 130 is distinct from the synchronization between multiple axes served by a single drive unit 130 described above, but has similar effect. For example, if one drive unit 130 is expected to operate in a known timing relationship with respect to a different drive unit 130, an offset parameter may be specified. If no synchronization exists, random operation may be presumed, and all drive units 130 may be active simultaneously for determining the current requirements of the power processing device 120.

Figure 3A:
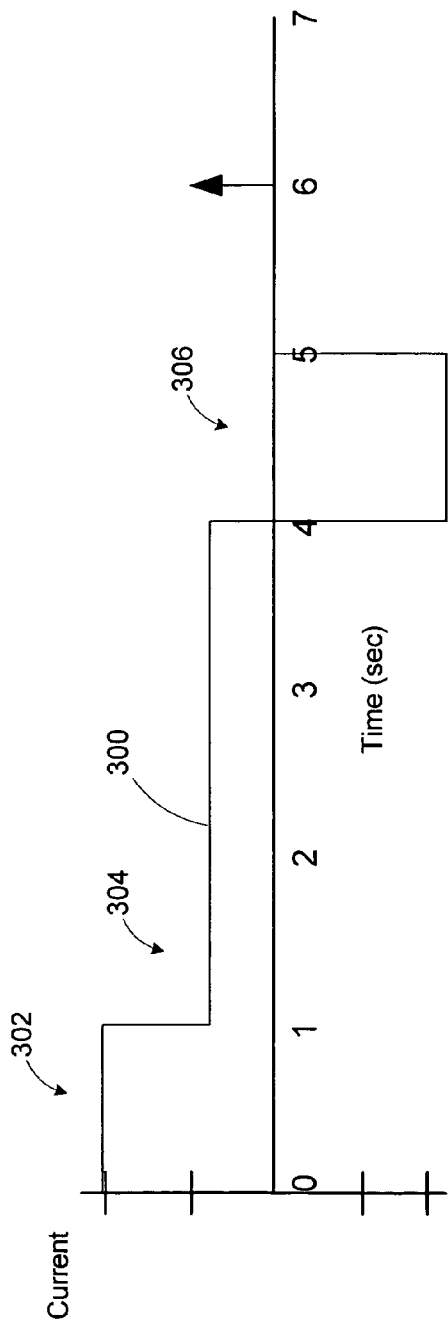
FIGS. 3A and 3B illustrate exemplary current profiles for drive units in the system of FIG. 1.
Figure 3B:
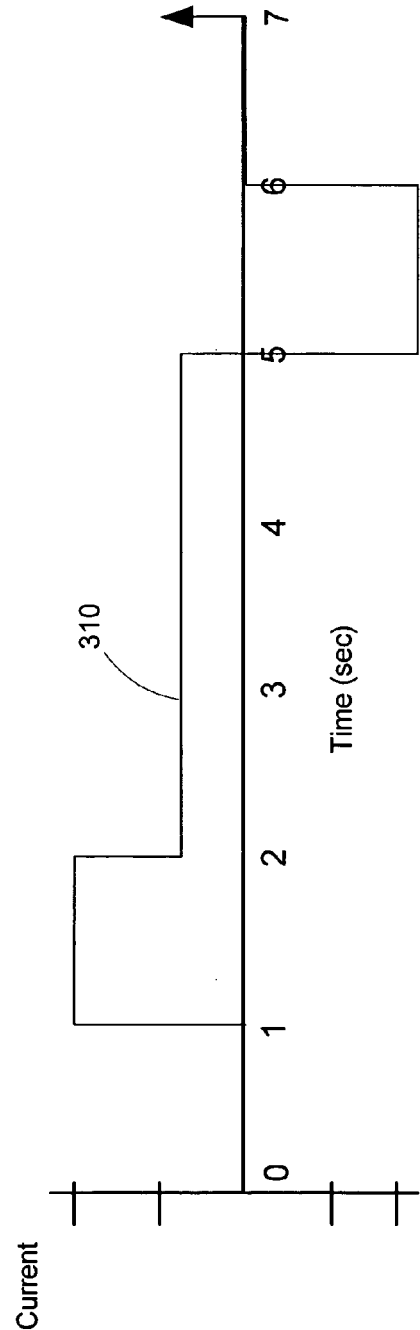

FIGS. 3A and 3B illustrate exemplary current profiles 300, 310 for two drive units 130. The current profiles are simplified for illustrative purposes and not intended to mirror actual current profiles. An actual profile would comprises sinusoidal waveforms of varying amplitude. As seen in FIG. 3A, current typically peaks when a motor is activated, as indicated by the region 302, and then reduces until a steady state current (i.e., corresponding to a steady state velocity) is achieved, as indicated by the region 304. When a motor is deactivated, a negative current region 306 occurs as regenerative power created by the motor during a regenerative braking operation is fed back to the bus.

Based on the system design, the user may know that the motor served by the drive unit 130 having the current profile 310 may start at a later time than the motor served by the drive units 130 having the current profile 300. In the example of FIGS. 3A and 3B, the current profile 310 is offset from the current profile 300 by about one second. Hence, the peak currents generated during the startup cycle of the drive units 130 do not align. Accordingly, the peak current determined by the sizing tool 200 is less than the peak that would have occurred had no synchronization been specified. In such a case, the sizing tool 200 would have assumed that the drive units 130 experienced their peak current demands at the same time.

The current profile for the power processing device 120 generated by the sizing tool 200 may have numerous uses. For example, the sizing tool 200 may verify that the proposed application is suitable for the selected power processing device 120. If the current requirements are exceeded, the sizing tool 200 may access an equipment database 240 that lists power processing devices and their associated ratings to recommend an alternative power processing device 120. In another embodiment, the user may not specify any particular hardware for the power processing device 120. The sizing tool 200 may determine the current requirements for the specified drive units 130 and then determine one or more power processing device 120 that may be used. If one power processing device 120 is not sufficient, the sizing tool 200 may divide the drive units 130 into distinct groups, each served by a different power processing device 120 and then iterate to determine current ratings and appropriately sized power processing devices 120 for each group.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for determining supply requirements for a motor control system, comprising:
   determining a performance profile for each of a plurality of drive units included in the motor control system, from at least one operational current parameter of each of the plurality of drive units under a given application;
   generating a power supply parameter for each drive unit based on the performance profiles;
   combining the power supply parameters for the each of the plurality of drive units to generate a -rating parameter for the motor control system; and
   based on the rating parameter, identifying components of the motor control system that are necessary during the given application.

2. The method of claim 1, wherein generating the rating parameter further comprises determining a combined current parameter for the motor control system using the operational current parameter of each of the plurality of drive units under the given application.

3. The method of claim 1, further comprising determining the operational current parameter for each of the plurality of drive units using at least one of a continuous current parameter and a peak current parameter associated with each of the plurality of drive units under the given application.

4. The method of claim 1, wherein determining the performance profile comprises determining a power profile for each of the drive units and further comprising identifying components of the motor control system that are unnecessary during the given application based on the rating parameter.

5. The method of claim 4, wherein generating the power supply parameter further comprises determining a current parameter based on the power profile.

6. The method of claim 1, further comprising:
   receiving synchronization data relating at least two of the drive units; and
   combining the power supply parameters based on the synchronization data to generate the rating parameter.

7. The method of claim 1, further comprising:
   comparing the generated rating parameter to a rating parameter of a power processing device; and
   determining the suitability of the power processing device for providing power to the motor control system responsive to the generated rating parameter being less than the rating parameter of the power processing device.

8. The method of claim 1, further comprising:
   comparing the generated rating parameter to rating parameters associated with a plurality of power processing devices; and
   selecting at least one of the power processing devices as being suitable for providing power to the motor control system based on the comparison.

9. The method of claim 1, further comprising:
   comparing the generated rating parameter to rating parameters associated with a plurality of power processing devices;
   dividing the plurality of drive units into at least two sets; and
   selecting at least one of the power processing devices for each of the sets based on the comparison.

10. A program storage device encoded with instruction that, when executed by a processing device, perform a method for determining supply requirements for a motor control system, the method comprising:
    determining a performance profile for each of a plurality of drive units included in the motor control system, from at least one operational current parameter of each of the plurality of drive units under a given application;
    generating a power supply parameter for each drive unit based on the performance profiles; and
    combining the power supply parameters for the plurality of drive units to generate a rating parameter for the motor control system;
    identifying unnecessary components of the motor control system that are at least one of underutilized and unutilized during the given application from the rating parameter; and
    at least one of reducing power supplied to the unnecessary components and removing the unnecessary components from motor control system.

11. The program storage device of claim 10, wherein generating the rating parameter in the method further comprises determining a combined current parameter for the motor control system using the operational current parameter of each of the plurality of drive units under the given application.

12. The program storage device of claim 10, further comprising determining the operational current parameter for each of the plurality of drive units using at least one of a continuous current parameter and a peak current parameter associated with each of the plurality of drive units under the given application.

13. The program storage device of claim 10, wherein determining the performance profile in the method comprises determining a power profile for each of the drive units.

14. The program storage device of claim 13, wherein generating the power supply parameter in the method further comprises determining a current parameter based on the power profile.

15. The program storage device of claim 10, wherein the method further comprises:
receiving synchronization data relating at least two of the drive units; and
combining the power supply parameters based on the synchronization data to generate the rating parameter.

16. The program storage device of claim 10, wherein the method further comprises:
comparing the generated rating parameter to a rating parameter of a power processing device; and
determining the suitability of the power processing device for providing power to the motor control system responsive to the generated rating parameter being less than the rating parameter of the power processing device.

17. The program storage device of claim 10, wherein the method further comprises:
comparing the generated rating parameter to rating parameters associated with a plurality of power processing devices; and
selecting at least one of the power processing devices as being suitable for providing power to the motor control system based on the comparison.

18. The program storage device of claim 10, wherein the method further comprises:
comparing the generated rating parameter to rating parameters associated with a plurality of power processing devices;
dividing the plurality of drive units into at least two sets; and
selecting at least one of the power processing devices for each of the sets based on the comparison.

19. A sizing tool for determining supply requirements for a motor control system, comprising:
a processing device programmed with instructions, that when executed, perform a method, comprising:
determining a performance profile for each of a plurality of drive units included in the motor control system, from at least one operational current parameter of each of the plurality of drive units under a given application;
generating a power supply parameter for each of the plurality of drive units based on the performance profiles;
combining the power supply parameters for the plurality of drive units to generate a rating parameter for the motor control system; and
identifying, from the rating parameter, components of the motor control system that are necessary during the given application.

20. A sizing tool for determining supply requirements for a motor control system, comprising:
means for determining a performance profile for each of a plurality of drive units included in the motor control system from at least one operational current parameter of each of a plurality of drive units in the motor control system under a given application;
means for generating a power supply parameter for each of the plurality of drive unit based on the performance profiles;
means for combining the power supply parameters for the plurality of drive units to generate a rating parameter for the motor control system; and
means for identifying components of the motor control system that are necessary to operate according to the given application based on the rating parameter.

* * * * *